United States Patent Office 2,767,148
Patented Oct. 16, 1956

2,767,148

METHOD FOR PREPARING CRACKING CATALYST INVOLVING A MILD ACID AND STEAM TREATMENT

Charles J. Plank, Woodbury, N. J., assignor to Socony Mobil Oil Company, Inc., a corporation of New York No Drawing. Application February 18, 1952,
Serial No. 272,259

9 Claims. (Cl. 252—453)

This invention relates to an improvement in the preparation of catalytic composites useful in the conversion of higher boiling hydrocarbons to lower boiling hydrocarbons, such as gasoline. More particularly, the present invention is concerned with a method for producing and activating synthetic siliceous cracking catalysts to yield a resultant catalyst characterized by an improved product distribution when employed in the cracking of high boiling petroleum hydrocarbons to gasoline.

Siliceous composites have long been recognized as useful in catalytically promoting hydrocarbon conversion reactions. Siliceous cracking catalysts ordinarily contain silica and one or more oxides. Active synthetic cracking catalysts are generally gels or gelatinous precipitates and include silica-alumina, silica-zirconia, silica-beryllia, silica-magnesia, as well as ternary combinations such as silica-alumina-zirconia, silica-alumina-beryllia, and silica-alumina-magnesia. Ordinarily, this type of catalyst contains silica and at least one material selected from the group, alumina, zirconia, beryllia, and magnesia. Other metal oxides may also be present, if desired, generally in small percentage, such as manganese, chromium, titanium, tungsten, molybdenum, and calcium.

Commercial catalytic cracking is carried out by contacting a hydrocarbon charge in the vapor or liquid state with a catalyst of the foregoing type under conditions of temperature, pressure and time to achieve substantial conversion of the charge to lower boiling hydrocarbons. This cracking reaction results in deposition of a carbonaceous deposit, commonly called coke, with consequent decline in catalytic activity of the catalyst. Under conditions to obtain efficient operation from a yield standpoint, it is desirable to terminate the cracking reaction after a relatively short conversion run, for example, of from 5 to 15 minutes on stream and to thereafter restore the activity of the catalyst by burning off the coke in a regeneration stage. The formation of coke represents a net loss since hydrocarbons are consumed in its production. In addition, it is apparent that the greater the coke deposit, the longer the regeneration period would have to be in proportion to the on-stream period in order not to exceed detrimental temperature levels during regeneration.

It is a major object of this invention to provide a cracking catalyst of low coke-forming tendencies. A further object is the provision of a method for preparing siliceous cracking catalysts characterized by an improved gasoline-to-coke ratio. A more specific object is to provide a process for preparing cogelled silica-alumina composites, yielding a catalyst capable of affording a reduction in coke formation during the cracking of high boiling hydrocarbons to hydrocarbons boiling within the gasoline range.

The above and other objects which will be apparent to those skilled in the art are achieved by the process described herein. Broadly, the present invention comprises a method of catalyst preparation which involves subjecting a siliceous hydrogel, substantially free of alkali metal, to a mild acid treatment and subsequently subjecting the acid-treated product to a mild steam treatment. It has been found, as will appear from the data set forth hereinafter, that siliceous cracking catalysts prepared in accordance with the instant method produce appreciably less coke during the cracking of high boiling hydrocarbons to gasoline as compared with corresponding catalysts made by conventional procedures in which the aforementioned mild acid treatment and steam treatment are absent.

The catalysts produces in accordance with the present invention are siliceous composites containing a major proportion of silica and a minor proportion of one or more metal oxides as described above. It is contemplated that hydrosols of silica and the desired metal oxide and the resulting hydrogels obtained upon the setting of said hydrosols may be prepared by any of the conventional procedures heretofore employed in the art. Some prior methods of preparation utilizing alkali metal reactants unavoidably involve the introduction in the resulting hydrogel of alkali metal, both in the form of water-soluble alkali metal salts and as zeolitic alkali metal. It is important for purposes of the present invention that the hydrogel undergoing the mild acid and steam treatments described herein be substantially free of alkali metal. Soluble alkali metal salts can be removed by water-washing the hydrogel. Zeolitic alkali metal, however, must be removed by a base-exchange operation. Thus, considering a particular example, silica-alumina hydrosol is conveniently prepared by admixture of sodium silicate and a sulfuric acid-aluminum sulfate solution. The resulting hydrosol and hydrogel obtained upon setting thereof contain sodium compounds which are formed as a product of the reaction. The sodium is ordinarily present in the freshly formed hydrogel both as sodium sulfate and as zeolitic sodium. The sodium sulfate can readily be removed by water-washing the hydrogel; zeolitic sodium, however, must be removed in a base-exchange treatment with a dilute solution of aluminum sulfate or other suitable aluminum salt whereby the zeolitic sodium is replaced by aluminum. Also, instead of an aluminum salt solution, it is feasible to employ base-exchange solutions of any other metal salts, the metal ion of which is desirably incorporated into the hydrogel. The zeolitic alkali metal present in the hydrogen may thus be removed by any convenient means. One highly effective method for removing zeolitic alkali metal from siliceous hydrogels containing the same is described in U. S. 2,453,585. The process of the present invention may also be utilized in the preparation of siliceous catalysts which, due to their method of preparation, do not contain zeolitic alkali metal. Thus, acidic hydrogels contain no zeolitic alkali metal and may ordinarily be freed of soluble alkali metal salts by simply washing with water. Likewise, if the siliceous hydrosol is prepared from reactants which do not contain alkali metal, the resulting hydrogel is free of alkali metal. For example, hydrogels may be produced from alkyl silicates, such as ethyl silicate, in which case no alkali metal is contained in the resulting hydrogel. A suitable process for such preparation is described in U. S. 2,419,272. It will thus be understood that the siliceous hydrogel undergoing treatment in accordance with the present process is one which is substantially free of alkali metal, either having been prepared under conditions whereby no alkali metal is incorporated in the hydrogel or having been washed and base-exchanged to remove substantially all of the alkali metal originally contained in the hydrogel.

In practice of the invention, an alkali-free siliceous hydrogel is subjected to a mild acid treatment, that is, treatment with an acid solution under conditions such that no appreciable amount of metal oxide is dissolved from the hydrogel. The acid-treated product is thereafter contacted with steam under mild treating conditions. The hydrogel may be subjected to such treatments any time after removal of alkali metal if such is contained in the original hydrogel. In those instances where the hydrogel is formed under conditions such that no alkali metal is contained therein, then the siliceous hydrogel may be treated, in accordance with the instant process, at any time after formation. As a practical matter, the hydrogel will ordinarily be subjected to the acid and subsequent steam treatment either (1) in the freshly formed state in which the hydrogel contains substantially all of its original water or (2) after drying of the hydrogel to remove substantially all of the original water at which point syneresis or shrinkage of the hydrogel is virtually complete or (3) after calcination of the dried hydrogel.

The particular conditions of acid and steam treatment will depend to a considerable extent on the status of the hydrogel, that is, whether it is in the freshly formed state or whether it has been dried or whether it has undergone calcination at an elevated temperature. In any case, the acid treatment of the siliceous hydrogel is sufficiently mild so that substantially no dissolution thereof is encountered during the extent of such treatment. While both organic and inorganic acids may be employed in treatment of the hydrogel, it is preferred to use organic acids since maximum reduction in coke formation has been achieved with the catalysts in which such acids have been used. After the acid treatment has been completed, the hydrogel is removed from contact with the treating solution and washed free of excess anions. The extent of washing required is determined by the particular acid used. Thus, sulfates and chlorides should be removed fairly completely by washing while nitrates and organic acid anions can be removed sufficiently by washing to a smaller degree.

The severity of the acid treatment is controlled by the strength of acid used, and the time of contact of the hydrogel with the acid is determined by the point at which the acid treatment is carried out. If acid treatment is effected prior to drying of the hydrogel, the metal oxide component, for example, alumina, magnesia, zirconia, etc., is very soluble so that a very dilute acid or short contact time is required. Washing, in such case, should preferably be kept at a minimum so that for treatment of the hydrogel prior to drying, nitric or organic acid treating solutions are recommended. If the acid treating step is carried out after drying of the hydrogel, the aforementioned metal oxide components are still quite soluble although much more resistant than before drying. The acid strength and time of treatment are thus intermediate between the conditions used for pretreating the freshly formed hydrogel and the product which has undergone calcination. When the acid activation is used on the calcined catalyst (e. g., calcined at 1000° F. or higher), the conditions of treating may be much more severe, although in an absolute way they are still very mild since substantially none of the solid catalyst is solubilized.

The above-described acid treatment may be carried out either batchwise, in which case the hydrogel is permitted to remain in the acid solution under generally static conditions for a predetermined length of time and then removed therefrom, or treatment may be effected by continuously percolating acid solution through a bed of the catalyst. The strength of the acid-treating solution, the time of treatment and the temperature of treatment are interrelated variables. Time and temperature conditions for satisfactory activation of the hydrogel vary inversely with the acid concentration. The proper selection of acid strength, time and temperature of treatment will depend on the status of the hydrogel as set forth hereinabove and on the choice of one of these three variables. It will be understood that the acid treatment is carried out under conditions such that subsequent steam treatment effects an appreciable reduction in the coke-forming tendencies of the resultant catalyst. Treatment with acid will accordingly be carried out under conditions sufficient to effect the desired catalyst activation but insufficient to dissolve any substantial portion of metal oxide component of the hydrogel. As pointed out hereinabove, the status of the hydrogel is a factor of considerable importance in determining the particular conditions under which acid treatment is carried out. In general, however, the concentration of acid solution employed is in the range of ½ to 50 percent; the time of treatment is at least about 1 hour and may extend over a considerable period ordinarily not exceeding about 200 hours; the temperature of treatment may range from room temperature of about 60° F. upwards and usually will not be greater than about 250° F. Within the foregoing ranges of treating conditions, it is preferred, when the hydrogel is in the freshly formed stage, i. e., containing substantially all of its original water content, to employ very mild conditions using an acid solution having a concentration not greater than about 5 percent; and a treating time of at least about 10 hours and a temperature not exceeding the normal boiling point of the acid solution. When the hydrogel undergoing acid treatment is in the dried state, i. e., when maximum shrinkage of the hydrogel has taken place, it is preferred to employ an acid solution of concentration not exceeding about 8 percent and a treating time of at least about 5 hours. Treatment of calcined hydrogel may be carried out under more severe conditions extending over the general ranges set forth above, the particular choice of conditions depending on the type of operation performed. Thus, if it is desired to complete acid treatment of the calcined hydrogel in a relatively short period of time, the temperature and concentration of the acid solution should be relatively high. On the other hand, if a comparatively dilute acid solution is employed, a correspondingly longer time of treatment will be required. It will thus be understood that a wide range of conditions may be used for acid treating of the siliceous hydrogels within the aforestated limits.

The acid may be either a mineral acid, such as sulfuric, nitric, hydrochloric, phosphoric, etc.; or an organic acid, such as acetic, oxalic, lactic, tartaric, and the like. In general, for the present process, it is preferred to employ organic acids since it has been found that they afford better reduction in coke formation, particularly when the acid treatment is carried out on the freshly formed hydrogel.

After acid treatment, the product is water-washed to remove excess anions. As indicated hereinabove, the extent of washing required is determined by the particular acid used. Thus, sulfates and chlorides require rather extensive washing for fairly complete removal, while nitrates and organic anions can be removed sufficiently by washing to a smaller degree. When the hydrogel or gel has been washed substantially free of excess acid anions, it is dried, calcined, if desired, and then subjected to mild steam treatment.

The exposure of the previously acid-treated hydrogel or gel catalyst to steam is, as will appear from data set forth hereinafter, a necessary step in the present process. Steam treatment may be carried out at a temperature within the approximate range of 800 to 1500° F. for at least about 2 hours. Usually steam at a temperature of about 1000 to 1300° F. will be used with the treating period extending from about 2 to about 48 hours. Temperatures above 1500° F. may be detrimental to the catalyst and should generally be avoided. Optimum improvement has been obtained by treatment at about 1100° F. for about 24 hours at atmospheric pressure in a 100 percent steam atmosphere. As long as critically high temperatures, which cause sintering of the catalyst, are avoided, longer periods of treatment than above designated apparently have no adverse effect. Also, an atmosphere consisting of a substantial amount of steam, say at least about 10 percent by volume but containing air or other gas substantially inert with respect to the catalyst being treated, may be used, and such mixtures are, in fact, desirable with the use of the more elevated temperatures to avoid possible deactivation of the catalyst.

After the above acid treatment and steam treatment, the catalyst is in an activated state and upon use in promoting the catalytic cracking of high boiling hydrocarbons to gasoline was found to produce appreciably less coke at a given activity than catalyst prepared by conventional methods in which the described acid and steam treatment are lacking.

The following non-limiting examples will serve to illustrate the process of the invention:

EXAMPLE 1

A silica-alumina hydrosol was prepared by mixing 1.00 volume of a solution of sodium silicate containing 157.0 grams of $SiO_2$ per liter with 1.00 volume of a solution containing 39.79 grams of aluminum sulfate and 30.51 grams of sulfuric acid per liter. The resulting colloidal solution was ejected from a nozzle in the form of globules into a column of gas oil, the depth of which was approximately 8 feet. The globules of solution fell through the oil and gelled before passing into a layer of water located beneath the oil. The time of gelation for the concentrations and proportions of reactants given above was about 4 seconds. The resulting spheroidal particles of hydrogel were conducted out of the bottom of the column into a stream of water and on removal from the water, base-exchanged with an aqueous solution of aluminum sulfate and water-washed until free of soluble material. The particles where then slowly and uniformly dried in superheated steam at about 300° F. until shrinkage of the gel particles was apparently complete. The dried particles were thereafter calcined at 1300° F. The coke make of the resulting catalyst at a 34 activity level, when tested in the standard CAT-A test, was 1.9 percent by weight.

A sample of 700 c. c. of silica-alumina catalyst prepared as described above was treated with 1000 c. c. of 5 percent sulfuric acid solution for 96 hours at room temperature. The product was thereafter water-washed free of sulfate and dried. The acid-treated catalyst was then treated for 24 hours at 1100° F. with 100 per cent steam and then tested for catalytic activity in the standard CAT-A test. The results obtained were as follows:

Gas gravity _____ 1.45
Gas, wt. percent _____ 5.2
Coke, wt. percent _____ 1.4
Gasoline, vol. percent at 410° F._____ 34.2

From the above data, it is to be noted that the coke was reduced from 1.9 percent to 1.4 percent as a result of the acid and steam treatment. Such treatment accordingly afforded a better than 25 percent reduction in coke make.

EXAMPLE 2

A sample of the silica-alumina catalyst prepared as described in Example 1 was treated with a 5 percent sulfuric acid solution for 48 hours at room temperature. The product was thereafter water-washed free of sulfate, dried, and tested in the standard CAT-A test. A portion of the acid-treated catalyst was treated for 24 hours at 1100° F. with 100 percent steam and also tested for catalytic activity in the CAT-A test. The results of said tests are hereinafter set forth in Table I.

EXAMPLE 3

A sample of the silica-alumina catalyst prepared as described in Example 1 was treated with 5 percent sulfuric acid solution for 96 hours at room temperature. The product was thereafter water-washed free of sulfate, dried, and tested in the standard CAT-A test. A portion of the acid-treated catalyst was treated for 24 hours at 1100° F. with 100 percent steam and thereafter tested for catalyst activity in the CAT-A test. The results obtained are set forth in Table I.

*Table 1*

| Example | Catalyst Treatment | CAT-A Test Results | | | | | |
|---|---|---|---|---|---|---|---|
| | | Bulk Density | Gas Gravity | Gas, Wt. percent | Coke, Wt. percent | Percent Coke Improvement [1] | Gasoline, Vol. percent at 410° F. |
| 2 | 5% $H_2SO_4$; room temperature for 48 hours | 0.73 | 1.50 | 7.2 | 2.4 | 10 | 40.9 |
| | Same+mild steam treatment | 0.74 | 1.53 | 4.5 | 1.5 | 32 | 37.0 |
| 3 | 5% $H_2SO_4$; room temperature for 96 hours | 0.73 | 1.50 | 6.9 | 2.3 | 11 | 40.0 |
| | Same+mild steam treatment | 0.73 | 1.45 | 5.2 | 1.4 | 24 | 34.2 |

[1] Percent coke improvement represents decrease in coke based on the coke which would be produced by a normal (non-acid treated) catalyst having the same activity as the experimental catalyst.

EXAMPLES 4–7

A silica-alumina-chromia hydrosol was prepared by mixing 1.00 volume of a solution of sodium silicate containing 163.5 grams of $SiO_2$ per liter with 1.00 volume of a solution containing 40.49 grams of aluminum sulfate, 28.41 grams of sulfuric acid, and 3.18 grams of chrome alum $[Cr_2(SO_4)_3 \cdot K_2SO_4]$ per liter. The resulting colloidal solution was ejected from a nozzle in the form of globules into a column of gas oil, the depth of which was approximately 8 feet. The globules of solution fell through the oil and gelled before passing into a layer of water located beneath the oil. The time of gelation for the concentrations and proportions of reactants given above was about 4 seconds. The resulting spheroidal particles of hydrogel were conducted out of the bottom of the column into a stream of water and on removal from the water, base-exchanged with an aqueous solution of aluminum sulfate and water-washed until free of soluble material. The particles were then slowly and uniformly dried in superheated steam at about 300° F. until shrinkage of the gel particles was apparently complete. The dried particles are thereafter calcined at 1300° F.

A sample of the above catalyst, after drying but before calcination, was treated with acids of different concentration and composition under varying conditions. The acid-treated catalyst was thereafter subjected to a mild steam treatment for 24 hours at 1100° F. with 100 percent steam and thereafter tested for catalytic activity in the standard CAT-A test. The nature of the catalyst treatment and the results of testing are set forth in Table II.

Table II

| Example | Treatment | CAT-A Test Results ||||| 
|---|---|---|---|---|---|---|
| | | Gas Gravity | Gas, Percent Wt. | Coke, Percent Wt. | Activity Index | Percent Coke Improvement [1] |
| 4 | 2% Sulfuric acid, 12 hrs | 1.53 | 10.3 | 3.9 | 44.4 | +5.1 |
| | Same + Mild Steam Treatment | 1.40 | 4.9 | 2.0 | 37.2 | +14.9 |
| 5 | ½% Sulfuric acid, 24 hrs | 1.53 | 10.8 | 3.9 | 43.5 | −5.4 |
| | Same + Mild Steam Treatment | 1.55 | 5.0 | 1.9 | 37.1 | +19.2 |
| 6 | 2% Oxalic acid, 12 hrs | 1.52 | 9.6 | 3.8 | 46.7 | None |
| | Same + Mild Steam Treatment | 1.50 | 4.9 | 1.7 | 36.6 | +26.0 |
| 7 | 2% Acetic acid, 12 hrs | 1.54 | 10.3 | 4.2 | 44.4 | −2.4 |
| | Same + Mild Steam Treatment | 1.44 | 5.9 | 2.0 | 38.9 | +27.2 |

All acid treatments were conducted at room temperature.
[1] See note (1), Table I. Negative results represent a higher coke than the normal.

EXAMPLES 8–13

A sample of the catalyst of Example 4, after base exchange but before drying, was treated with acids of different concentration and composition under varying conditions. The catalyst in each instance was thereafter subjected to steam treatment for 24 hours at 1100° F. with 100 percent steam and then tested for catalytic activity in the standard CAT-A test. The nature of the treatment and the results of testing are set forth in Table III.

Table III

| Example | Treatment | CAT-A Test Results ||||| 
|---|---|---|---|---|---|---|
| | | Gas Gravity | Gas, Percent Wt. | Coke, Percent Wt. | Activity Index | Percent Coke Improvement [1] |
| 8 | 2% HNO₃ | 1.62 | 12.1 | 4.6 | 46.2 | +17.7 |
| | Same + Mild Steam Treatment | 1.53 | 5.4 | 2.0 | 37.7 | |
| 9 | 2% H₃PO₄ | 1.57 | 12.7 | 4.4 | 43.1 | +20.2 |
| | Same + Mild Steam Treatment | 1.52 | 5.5 | 1.9 | 37.3 | |
| 10 | 2% H₂SO₄ | 1.53 | 11.4 | 4.6 | 45.1 | +17.4 |
| | Same + Mild Steam Treatment | 1.49 | 5.0 | 1.9 | 36.8 | |
| 11 | 2% Acetic acid | 1.63 | 10.6 | 3.9 | 46.8 | +33.4 |
| | Same + Mild Steam Treatment | 1.44 | 6.2 | 2.0 | 41.1 | |
| 12 | 2% Oxalic acid | 1.63 | 10.1 | 3.7 | 46.9 | +36.0 |
| | Same + Mild Steam Treatment | 1.50 | 5.4 | 1.6 | 38.0 | |
| 13 | 2% Tartaric acid | 1.59 | 10.9 | 4.1 | 47.2 | +25.5 |
| | Same + Mild Steam Treatment | 1.55 | 4.9 | 1.7 | 36.4 | |

All acid treatments were conducted at room temperature for a period of 24 hours.
[1] See note (1), Table I.

EXAMPLES 14–19

A sample of the catalyst of Example 4, before base exchange, was treated with acids of different concentration and composition under varying conditions. The catalyst in each instance, after washing and drying, was tested in the standard CAT-A test. The nature of the acid treatment and the results of said tests are set forth in Table IV.

Table IV

| Example | Treatment | CAT-A Test Results ||||
|---|---|---|---|---|---|
| | | Gas Gravity | Gas, Percent Wt. | Coke,[1] Percent Wt. | Activity Index |
| 14 | 2% H₂SO₄ | 1.25 | 2.6 | 1.6 | 24.4 |
| 15 | 1% H₂SO₄ | 0.81 | 1.2 | 1.5 | 12.0 |
| 16 | ½% H₂SO₄ | 0.61 | 1.0 | 2.0 | 7.3 |
| 17 | 2% Acetic acid | 0.70 | 1.3 | 1.7 | 9.0 |
| 18 | 2% Oxalic acid | 0.77 | 0.8 | 1.3 | 6.8 |
| 19 | 2% H₃PO₄ | 0.79 | 1.6 | 1.9 | 11.8 |

Acid treatments were carried out at room temperature for a period of 25½ hours, except phosphoric acid treatment which was for 22½ hours.
[1] All these coke results are much higher than would be expected for normal catalysts aged to the same activity level.

It is to be noted from the foregoing table that if the acid treatment is carried out prior to base exchange, the catalytic activity of the catalyst is greatly impaired with no benefit to the gasoline/coke ratio. It is accordingly a critical feature of applicant's process that the siliceous hydrogel undergoing treatment be substantially free of alkali metal. It will be evident, from the tabulated results of the Tables I–III, that acid treatment of the alkali-free hydrogel or gel and subsequent steam treatment afforded in every case a distinct improvement in coke reduction.

I claim:

1. In a process for manufacturing a siliceous cracking catalyst by the formation of a siliceous hydrosol and gelation of said hydrosol to a hydrogel, the improvement which comprises subjecting the siliceous hydrogel, substantially free of alkali metal, to treatment with a dilute acid solution of less than about 5 percent by weight concentration for a period of at least about 10 hours but not exceeding about 200 hours at a temperature between about 60° F. and the normal boiling point of said acid solution, under conditions such that substantially no dissolution of the hydrogel is encountered, washing water-soluble material from the acid-treated hydrogel and thereafter subjecting the washed hydrogel to treatment with steam at a temperature in the range of about 800° F. to about 1500° F. for at least about 2 hours.

2. In a process for manufacturing a siliceous cracking catalyst by the formation of a siliceous hydrosol, gelation of said hydrosol to a hydrogel, and drying said hydrogel, the improvement which comprises subjecting the dried siliceous hydrogel, substantially free of alkali metal, to treatment with a dilute acid solution of less than about 8 percent by weight concentration for a period of at least about 5 hours but not exceeding about 200 hours at a temperature between about 60° F. and about 250° F., under conditions such that substantially no dissolution of the hydrogel is encountered, washing water-soluble material from the acid-treated product and subjecting the same to treatment with steam at a temperature in the range of about 800° F. to about 1500° F. for at least about 2 hours.

3. In a process for manufacturing a siliceous cracking catalyst by the formation of a siliceous hydrosol, gelation of said hydrosol to a hydrogel, drying said hydrogel, and calcining the dried hydrogel, the improvement which comprises subjecting the calcined siliceous gel, substantially free of alkali metal, to treatment with an acid at between about ½ and about 50 percent by weight concentration for at least about 1 hour but not exceeding about 200 hours at a temperature between about 60° F. and about 250° F., under conditions such that substantially no dissolution of the gel is encountered, washing water-soluble material from the acid-treated gel and subjecting the washed gel to treatment with steam at a temperature between about 800° F. and about 1500° F. for at least about 2 hours.

4. In a process for manufacturing a siliceous cracking catalyst by the formation of a siliceous hydrosol comprising silica and at least one metal oxide which in combination with silica affords a composite useful in catalytically cracking heavy petroleum oils to materials boiling in the range of gasoline and gelation of said hydrosol to a hydrogel, the improvement which comprises subjecting the siliceous hydrogel, substantially free of alkali metal, to treatment with an acid at a temperature between about 60° F. and about 250° F. for a period of at least about 1 hour but not exceeding about 200 hours under conditions such that substantially no dissolution of the hydrogel is encountered, washing water-soluble material from the acid-treated hydrogel and thereafter subjecting the washed hydrogel to treatment with steam at a temperature in the range of about 800° F. to about 1500° F. for at least about 2 hours.

5. In a process for manufacturing a silica-alumina gel cracking catalyst by the formation of a silica-alumina hydrosol and gelation of said hydrosol to a hydrogel, the improvement which comprises subjecting the silica-alumina hydrogel, substantially free of alkali metal, to treatment with a dilute acid solution of less than about 5 per cent by weight concentration for a period of at least about 10 hours but not exceeding about 200 hours at a temperature between about 60° F. and the normal boiling point of said acid solution, under conditions such that no appreciable amount of alumina is dissolved therefrom, washing water-soluble material from the acid-treated hydrogel, and thereafter subjecting the same to treatment with steam at a temperature between about 800° F. and about 1500° F. for at least about 2 hours.

6. In a process for manufacturing a silica-alumina gel cracking catalyst by formation of a silica-alumina hydrosol, gelation of said hydrosol to a hydrogel and base-exchanging said hydrogel to remove zeolitic alkali metal, the improvement which comprises subjecting the resulting silica-alumina hydrogel to treatment with a dilute acid solution of less than about 5 percent by weight concentration for a period of at least about 10 hours but not exceeding about 200 hours at a temperature between about 60° F. and about 250° F. under conditions such that no appreciable amount of alumina is dissolved therefrom, washing water-soluble material from the acid-treated hydrogel and thereafter subjecting the same to treatment with steam at a temperature between about 1000° F. and about 1300° F. for a period of from about 2 to about 48 hours.

7. In a process for manufacturing a silica-alumina gel cracking catalyst by intimately mixing an alkali metal silicate, an acid, and an aluminum salt solution to yield a silica-alumina hydrosol, gelling said hydrosol to a hydrogel, base-exchanging said hydrogel to remove zeolitic alkali metal, and drying said hydrogel, the improvement which comprises subjecting the dried silica-alumina hydrogel, substantially free of alkali metal, to treatment with a dilute acid solution of less than about 8 percent by weight concentration for a period of at least about 5 hours but not exceeding about 200 hours at a temperature between about 60° F. and about 250° F., under conditions such that substantially no dissolution of alumina is encountered, washing water-soluble material from the acid-treated product, and subjecting the same to treatment with steam at a temperature in the range of about 800° F. to about 1500° F. for at least about 2 hours.

8. In a process for manufacturing a silica-alumina cracking catalyst by the formation of a silica-alumina hydrosol and gelation of said hydrosol to a hydrogel, the improvement which comprises subjecting the silica-alumina hydrogel, substantially free of alkali metal, to treatment with a dilute organic acid solution of less than about 5 percent by weight concentration for a period of at least about 10 hours but not exceeding about 200 hours at a temperature between about 60° F. and the normal boiling point of said acid solution, under conditions such that substantially no dissolution of alumina is encountered, washing water-soluble material from the acid-treated hydrogel and thereafter subjecting the washed hydrogel to treatment with steam at a temperature between about 1000° F. and about 1300° F. for a period of from about 2 to about 48 hours.

9. In a process for manufacturing a silica-alumina cracking catalyst by intimately mixing an alkali metal silicate, an acid, and an aluminum salt solution to yield a silica-alumina hydrosol, gelling said hydrosol to a hydrogel, base-exchanging said hydrogel to remove zeolitic alkali metal, drying said hydrogel, and calcining the dried hydrogel, the improvement which comprises subjecting the silica-alumina calcined gel, substantially free of alkali metal, to treatment with an acid at between about ½ and about 50 percent by weight concentration for at least about 1 hour but not exceeding about 200 hours at a temperature between about 60° F. and about 250° F., under conditions such that substantially no dissolution of alumina is encountered, washing water-soluble material from the acid-treated gel, and subjecting the washed gel to treatment with steam at a temperature between about 1000° F. and about 1300° F. for a period of from about 2 to about 48 hours.

References Cited in the file of this patent

UNITED STATES PATENTS

| | | |
|---|---|---|
| 1,976,127 | Huber | Oct. 9, 1934 |
| 2,378,155 | Newsome et al. | June 12, 1945 |
| 2,428,741 | Plank | Oct. 7, 1947 |
| 2,477,373 | Hunter | July 26, 1949 |
| 2,480,628 | Bodkin | Aug. 30, 1949 |
| 2,507,864 | Moore et al. | May 16, 1950 |
| 2,581,014 | Gorin et al. | Jan. 1, 1952 |
| 2,645,619 | Hoekstra | July 14, 1953 |